Jan. 23, 1968 A. M. BRZEZINSKI 3,365,554

PREVENTION OF DIALING BY A TELEPHONE SWITCHHOOK

Filed Oct. 16, 1964 2 Sheets-Sheet 1

INVENTOR
A. M. BRZEZINSKI
BY Leo Stanger
ATTORNEY

Jan. 23, 1968 A. M. BRZEZINSKI 3,365,554

PREVENTION OF DIALING BY A TELEPHONE SWITCHHOOK

Filed Oct. 16, 1964 2 Sheets-Sheet 2

United States Patent Office 3,365,554

Patented Jan. 23, 1968

3,365,554
PREVENTION OF DIALING BY A TELEPHONE SWITCHHOOK

Alex M. Brzezinski, Lawrence, Ind., assignor to Bell Telephone Laboratories, Incorporated, New York, N.Y., a corporation of New York Filed Oct. 16, 1964, Ser. No. 494,448
5 Claims. (Cl. 179—168)

ABSTRACT OF THE DISCLOSURE

Switchhook dialing is prevented by connecting telephone switchhook leads through the contacts of a mercury switch and mounting the switch on the switchhook. The mercury switch is placed so that allowing the switchhook to lift causes the switch's mercury pool to connect its contacts. Depressing the switchhook disconnects the contacts. However, breakup of the mercury pool occurs if the switchhook is operated at speeds higher than the lowest frequency pulse train which the slowest central office recognizes as a dialed digit. This destroys the effect of switchhook dialing.

This invention relates to telephones and particularly to devices for preventing switchhook dialing in a coin telephone.

Coin telephones respond to a customer's upwardly releasing the switchhook and depositing the proper coins, by producing an audible dial tone which indicates to the customer that the dial circuit is engaged and ready for use. By dialing, the customer then produces series of pulse trains that signal a central office to connect him to the telephone of another customer.

Coin telephones are subject to improper use by persons who fraudulently engage the telephone circuitry enough to acquire a dial tone, without depositing the correct coins, and then dialing their number. Newer coin telephones prevent such fraudulent practices by disabling the dialing pulser in the telephone circuit until proper coins have been deposited. Thus, no call can be dialed on the basis of fraudulent circuit engagement sufficient only to acquire a dial tone. However, in these new telephones the switchhook plunger arm actuates a starter switch, series connected with the dialing pulser of the telephone circuit. By properly manipulating the switchhook plunger arm, this starter switch can generate pulse trains which can operate as dialing pulses. This operation, called switchhook dialing, is unfortunately effective, even if dial tone acquisition was fraudulent.

An object of this invention is to improve telephones, particularly to curb the effectiveness of switchhook dialing.

Another object of the invention is to prevent the effects of switchhook dialing in coin telephones particularly and in telephones generally.

To these ends and according to a principle of this invention, switchhook dialing is prevented in telephones by connecting between the switchhook plunger and the lines which the hook switch normally connects, sensor means that distinguish between the normal switchhook operation and switchhook dialing. The invention is based on the recognition that switchhook dialing is possible only because a central telephone exchange can mistake the pulses produced by a switchhook for dial pulses. The invention is based on the further recognition that the central exchange will confuse fraudulent switchhook pulse trains with dial pulse trains, and yet correctly recognize normal switchhook pulses because it is frequency dependent. Only high switchhook pulse frequencies are confused by the central exchange with the usually high frequency dial pulse frequencies.

Thus, according to a more specific aspect of this invention the before-mentioned sensor means comprise a low pass mechanical filter mechanism that has a cutoff frequency at or below the lowest frequency pulse train the central office mistakes for a dial pulse train. This type of filter mechanism may comprise a container mounted on the switchhook plunger and having therein a pair of separated electrical contact means and a pool of conductive liquid—for example a mercury switch—in such a position that the pool conductively connects the contact means in one plunger position and disconnects the contact means in a second plunger position. Thus, if the plunger arm is shifted slowly the pool will close and open the contact means according to its position. On the other hand, if the plunger arm is shifted rapidly the pool fails to follow the motion. The pool ultimately separates into a plurality of portions, none of which conductively connect the contacts at intervals corresponding to the switchhook plunger.

These and other features of the invention, broader and more specific, are pointed out in the claims forming a part of this specification. Other objects and advantages of the invention will become obvious from the following detailed description when read in light of the accompanying drawing, wherein:

Figure 1:
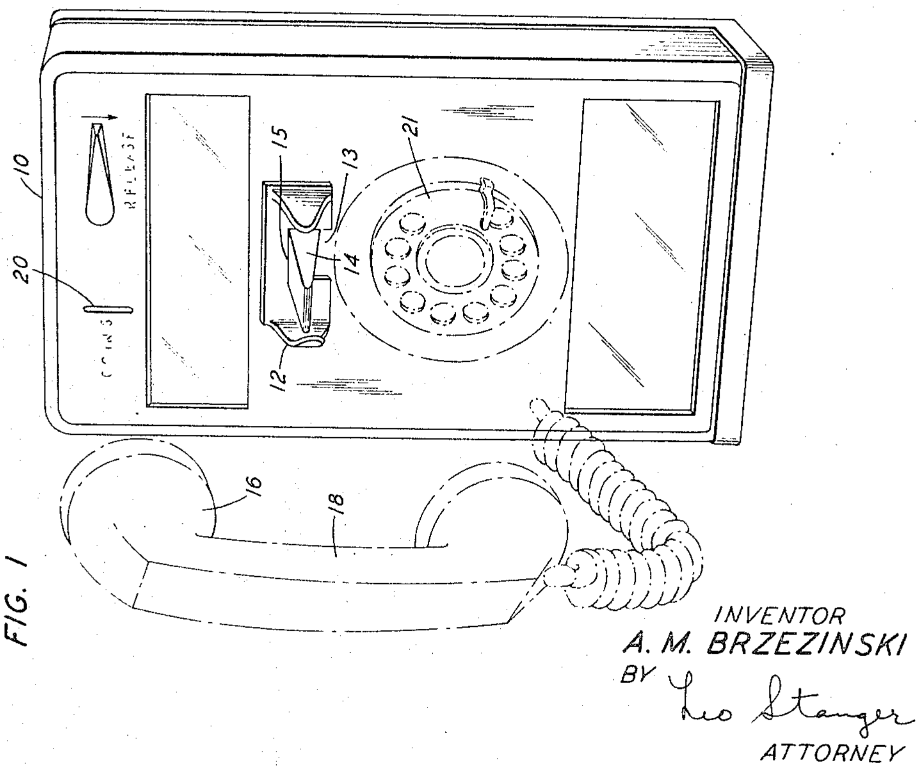
FIG. 1 is a perspective view of a coin telephone embodying features of the invention.

In FIG. 1 a coin telephone comprises a housing 10 supporting a stationary handset-holding cradle 12. Projecting outwardly through an opening 13 in the front face of the housing 10, and into the cradle 12, is a vertically movable switchhook plunger arm 14. The latter is normally urged into an upward off-hook position against the surface 15 of the cradle. The telephone includes an earpiece 16 of a handset 18 which when "hung" in the cradle 12 forces the plunger arm 14 downwardly into its "on-hook" position. A customer initiates a telephone call by lifting the handset 18 from the cradle 12, thereby allowing the plunger arm 14 to move upwardly, and then depositing the proper coins in a slot 20 on the housing 10. After receiving a dial tone he uses the dial 21 on the housing 10 to have the central telephone office connect him to the receiving party.

Figure 2:
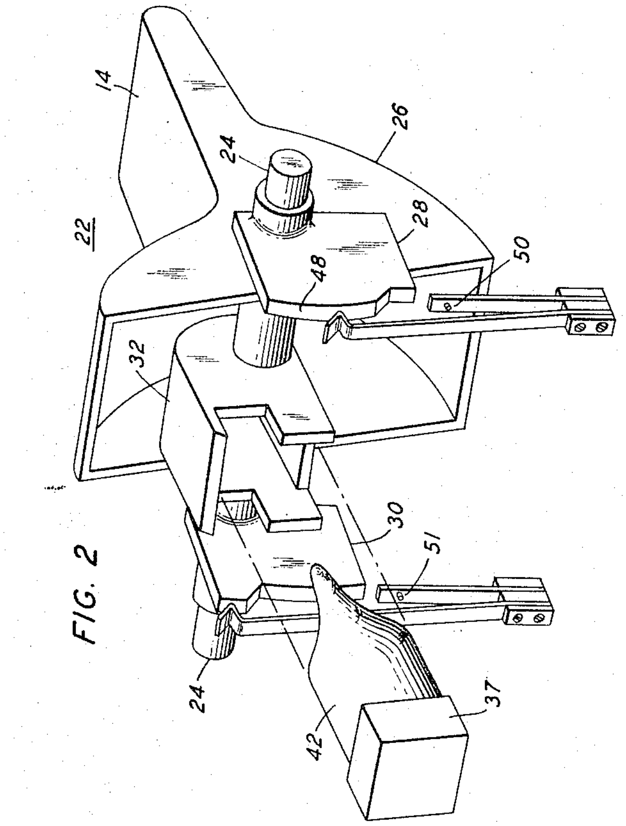
FIG. 2 is an exploded and perspective view of a telephone switchhook plunger of which only the plunger arm is visible in FIG. 1.

The plunger arm 14 projecting through the housing 10 forms an integral part of a molded plastic switchhook plunger 22 illustrated in FIG. 2. The plunger 22 is rotatable within the housing 10 about a shaft 24. The plunger 22 integrally includes a hollow shell-like arm support 26, from which the arm 14 projects, as well as a pair of cams 28 and 30. The support 26 obstructs portions in the opening 13 not occupied by arm 14. Securely mounted on the plunger 22 between the cams 30 and 28 is a chamber 32, of synthetic material commercially available as Delrin, that receives a mercury switch 34.

Figure 3:
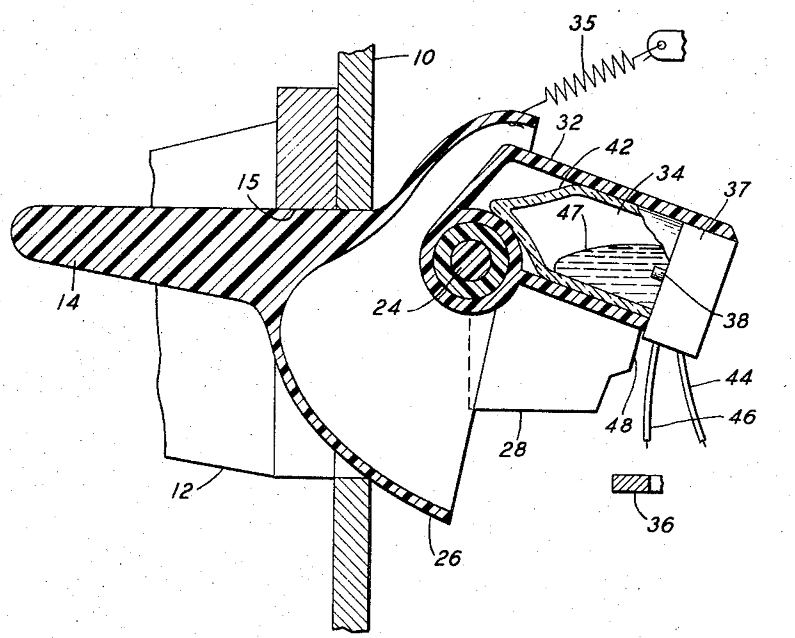
FIGS. 3 and 4 are side elevations, partially in section, of a portion of FIG. 1 showing the switchhook plunger as it appears in the off-hook and on-hook positions respectively.
Figure 4:
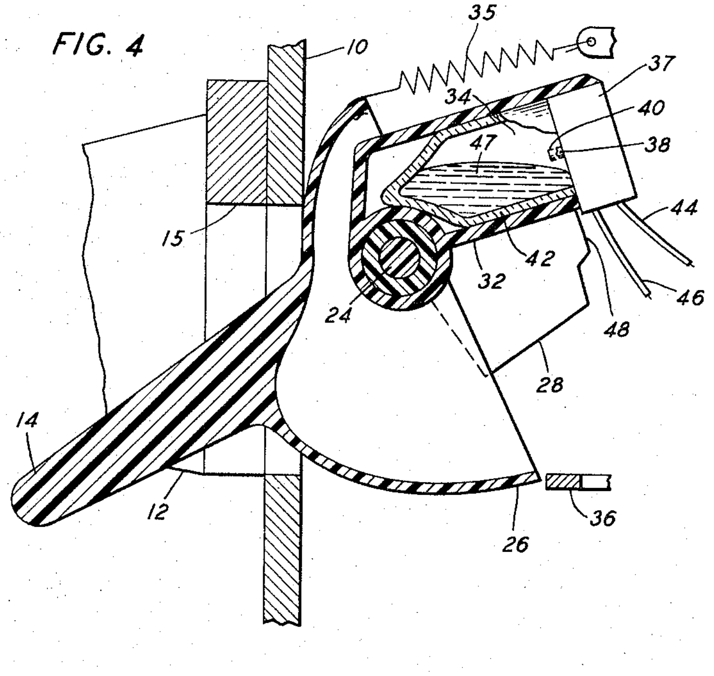

FIGS. 3 and 4 show the switch 34 more clearly and illustrate its relationship to the remainder of the switchhook plunger 22 and to the housing 10. FIG. 3 illustrates the operative conditions of the switch 34 when the switchhook plunger arm 14 is released. Here, an extensible spring 35, shown schematically to extend from a fixed point, urges the plunger 22 clockwise about the shaft 24 against the surface 15 in the cradle 12. The arm 14 is then in the upward off-hook condition. FIG. 4 shows the position of plunger 22 as it would be when the handset 18 is in the cradle 12 and depresses the arm 14 into its downward on-hook condition, thereby rotating the plunger 22 about the shaft 24 against the force of spring 35. The arm 14 may be depressed otherwise than with the handset 18, such as with a finger slightly further than shown until the back of support 26 reaches a fixed stop 36 (shown schematically).

As shown in FIGS. 3 and 4, the switch 34 possesses a base 37 which supports two interiorly projecting, horizontally spaced, contacts 38 and 40 and supports at its periphery a glass bulb 42. The base 37 and bulb 42 fit securely within the chamber 32. A pair of wire leads 44 and 46 extending respectively from contacts 38 and 40 project outwardly from the base for connection to one of a number of local telephone circuits. A mercury pool 47 sufficiently large to conductively touch both of the contacts 38 and 40 flows from the position shown in FIG. 3 to that shown in FIG. 4 when the plunger arm 14 is depressed from its off-hook position to its on-hook position and thereby rotates the plunger 22 and its chamber 32 about the shaft 24.

In the off-hook position of FIG. 3 the mercury pool 47 connects the contacts 38 and 40 electrically. It then completes the connection between the wire leads 44 and 46. In the on-hook position shown in FIG. 4 the mercury pool 47 slides downwardly to the tip of the glass tube and breaks the connection between the contacts 38 and 40.

The cams 28 and 30 possess peripheral cam surfaces 48 and 49. While traveling circularly with the plunger 22 about the shaft 24, the cams press their peripheral cam surfaces 48 and 49 against flexible members of two leaf switches 50 and 51. During upward or downward travel of the arm 14 the cam surfaces 48 and 49 open and close these leaf switches 50 and 51 in a sequence that depends upon the contours of the surfaces 48 and 49. These leaf switches also form part of the local telephone circuit. The position of the chamber 31 and hence the switch 32 is such that the mercury pool will connect the contacts 38 and 40 at a time in the depressing or ascending cycle of the arm 14 that is coordinated with the times and sequence that the contour surfaces 48 and 49 close their respective leaf springs 50 and 51. This sequence is essential for proper operation of the telephone. In prior models of telephones the space occupied by the chamber 32 belonged to a third cam between the cams 28 and 30 whose contour was adapted to close a third, center, leaf spring switch in the desired sequence.

Figure 5:
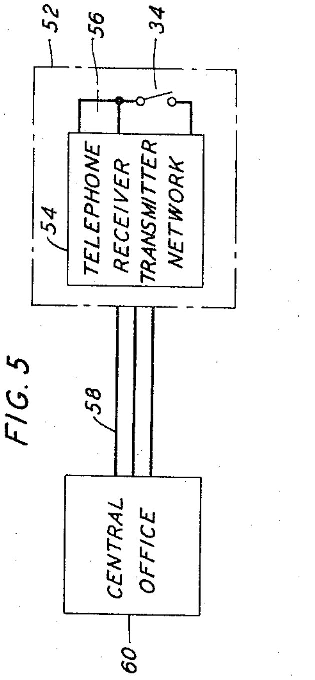
FIG. 5 is a block diagram generally illustrating the circuit of the telephone system of which the circuit of the coin telephone in FIG. 1 is a part.

FIG. 5 illustrates the general circuit relations prevailing within the telephone system of which the switch 34 is a part. Here, the local circuit 52 of the coin telephone within 10 and handset 18 comprises a telephone receiver-transmitter network 54 connecting to a dialing pulser 56 and the switch 34 which are in series. The dialing pulser 56 is operated by operation of the dial 21 in FIG. 1. The circuit 52 connects through appropriate lines 58 to a central office 60.

It was discovered in earlier coin telephones that a party could obtain a dial tone by "false grounds" and thus complete their calls by dialing. This fradulent procedure was eliminated by disabling the dialing pulser, such as 56, with a coin recognition circuit, forming part of the receiver-transmitter network, such as 54, until proper coins had been deposited. This thereby prevents the party from dialing successfully despite the acquisition of a dial tone. However, the switchhook operated several leaf switches, one of which was in the position of switch 34 connected in series with the dialing circuit, so that if this leaf switch were turned on and off at a sufficiently constant and rapid rate the central office would mistake the resulting switching as dialing pulses. Thus, it was still possible to circumvent the circuits that prevented dialing despite the acquisition of a fraudulent dial tone.

While the two cams 28 and 30 as well as the switch 34 all serve to open and close circuits in response to movement of the switchhook plunger arm 14, only the present switch 34 is connected in series with the dialing pulser 56 so as to produce pulses which are mistakable by the telephone system as dialing pulses.

Under normal usage of the switchhook plunger arm 14 which moves up and down, the pool 47 will follow this motion faithfully and thereby open and close the conductive contact between the contacts 38 and 40 at the prescribed sequential time in the motion cycle of the arm 14. That is, the pool "follows" the arm 14 and the switching action "follows" the arm 14.

However, the pool 47 is unable to follow rapid motion of the arm 14. It is such rapid motions which are necessary for switchhook dialing. In fact, switchhook dialing is possible only if arm 14 is moved up and down between the positions of FIGS. 3 and 4 and produces pulses at a rate faster than five pulses per second. Pulses produced at this five pulse per second rate are the slowest that would be mistaken by the slowest frequency-dependent central office as dial pulses. The orientation of the switch 34 is such that if the plunger arm 14 is released and depressed at a rate equal to or faster than five pulses per second the mercury pool 47 breaks up and is incapable of following the movement of the plunger arm 14. In fact, the mercury pool operation would be so erratic that the resulting connections and disconnections of the leads 44 and 46 become unintelligible as pulses by the telephone system. Therefore, any attempt at switchhook dialing would be ineffective. It has been found, with a telephone system using this switching method according to the invention, that switchhook dialing produces only pulse trains recognizable as "ones."

The switch 34 preferably has a low differential angle, that is, a small difference in the angle of the longitudinal axis from a condition where the mercury pool just makes and just breaks conductive connection between its contacts 38 and 40. Such a switch is a type 408 produced by the Minneapolis-Honeywell Corporation. In the off-hook condition the chamber 32 holds such a mercury switch 34 at an angle relative to the horizontal of 15 degrees with its center axis spaced .22 inch from the center of the shaft 24. The plunger rotates through a maximum angle of 45 degrees. This orientation causes the pool to break up if the plunger arm 14 is jiggled approximately five times per second. Yet, it causes the pool to connect and disconnect the contacts 38 and 40 at the right time in sequence with other switches actuated by cams 28 and 30. The mercury switch 34 is hermetically sealed so that dust, dirt, moisture, and corrosive gases cannot affect the operation.

This prevention of switchhook dialing helps to provide a superior telephone and generally more reliable type of switching. It is applicable not only in coin telephones but in other telephones where switchhook dialing may be a problem, such as in a location where a lock is placed on the dial of an ordinary office telephone.

While an embodiment of the invention has been described in detail, it will be obvious to those skilled in the art that the invention may be embodied otherwise without departing from its spirit and scope.

What is claimed is:

1. A telephone system comprising receiving-transmitting means, a central telephone office to which said receiving-transmitting means are connected, said receiving-transmitting means including a pair of electrical lead means, movable switchhook means, pulse producing dial means forming a part of said receiving-transmitting means and connected in series with said lead means for generating pulses to said central office, said central telephone office together with said receiving-transmitting means being substantially unresponsive to dialing pulse trains lower than a predetermined rate, a low pass filter mounted on said switchhook means and connected to said lead means for controlling the flow of current in said lead means according to the movement of said switchhook means, said filter comprising container means mounted on said switchhook, a pair of separated electrical contact means in said container means, a pool of conductive liquid in said container means, said switchhook being biased into one position and shiftable to a second position, said pool conductively connecting said contact means only in one of said positions, said pool being shiftable from one position to another only by movement of said switchhook means at a rate slower than the predetermined rate.

2. A telephone comprising receiving - transmitting means, connector means for connecting said receiving-transmitting means to a central telephone exchange, a pair of leads in said connector means, said connector means responding to joining of said leads electrically by connecting said receiving-transmitting means to the central telephone exchange, pulse producing dial means connected to said connector means for transmitting pulses to said central telephone exchange, said connector means including a pivotally movable container having a pair of electrodes connected to said leads, and a pool of electroconductive liquid for connection to said electrodes when the container is tilted in one direction, said pool being able to follow tilting movement of said container only when said tilting movement occurs at rates less than the pulse rate of said dial means.

3. A telephone comprising dialing means for issuing a plurality of pulses so as to select a receiving telephone to which information can be transmitted, a switchhook arm movable between two positions, switch means connected to said dialing means and responding to movement of said arm to open and close, said switch means including filter means for responding only to those arm movements slower than a predetermined rate, said filter means including an insulating container connected to said arm for responding to its movement, a pair of leads in said container, and a pool of conductive liquid in said container.

4. A telephone comprising dialing means for issuing a plurality of pulses so as to select a receiving telephone to which information can be transmitted, a switchhook arm movable between two positions, switch means connected in series with said dialing means and responding to movement of said arm to open and close, said switch means including filter means for responding only to those arm movements slower than a predetermined rate.

5. A telephone comprising dialing means for issuing a plurality of pulses so as to select a receiving telephone to which information can be transmitted, a switchhook arm movable between two positions, switch means connected in series with said dialing means and responding to movement of said arm to open and close, said switch means including filter means for responding only to those arm movements slower than a predetermined rate, said filter means including an insulating container connected to said arm for responding to its movement, a pair of leads in said container, and a pool of conductive liquid in said container.

References Cited

UNITED STATES PATENTS

| | | | |
|---|---|---|---|
| 379,074 | 3/1888 | Lambdin | 178—167 X |
| 620,042 | 2/1899 | Krausse | 179—168 X |
| 1,131,624 | 3/1915 | Erickson | 179—169 |
| 2,140,655 | 12/1938 | Sloan | 179—168 X |

FOREIGN PATENTS

| | | |
|---|---|---|
| 374,822 | 12/1930 | Great Britain. |

WILLIAM C. COOPER, *Primary Examiner.*